No. 654,186. Patented July 24, 1900.
A. STENHOUSE & E. A. WHITEHEAD.
TIME VALVE OPERATING MECHANISM.
(Application filed Sept. 2, 1899.)

(No Model.) 3 Sheets—Sheet 1.

Witnesses:
C. Holloway
H. C. Pinckney

Inventors:
Andrew Stenhouse
Edwin Atkinson Whitehead
By J. E. M. Bowen
Attorney

No. 654,186. Patented July 24, 1900.
A. STENHOUSE & E. A. WHITEHEAD.
TIME VALVE OPERATING MECHANISM.
(Application filed Sept. 2, 1899.)
(No Model.) 3 Sheets—Sheet 2.
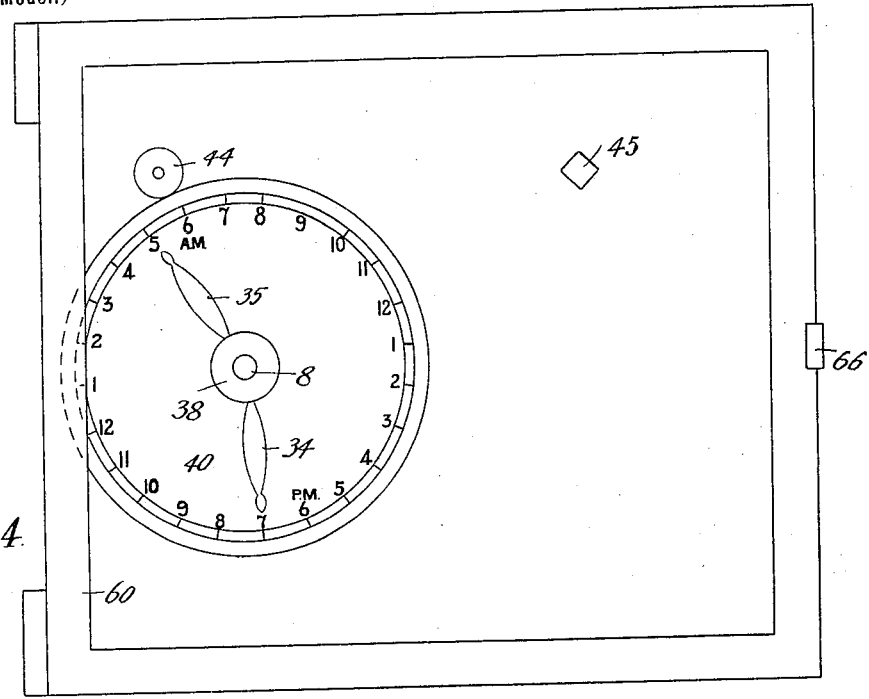
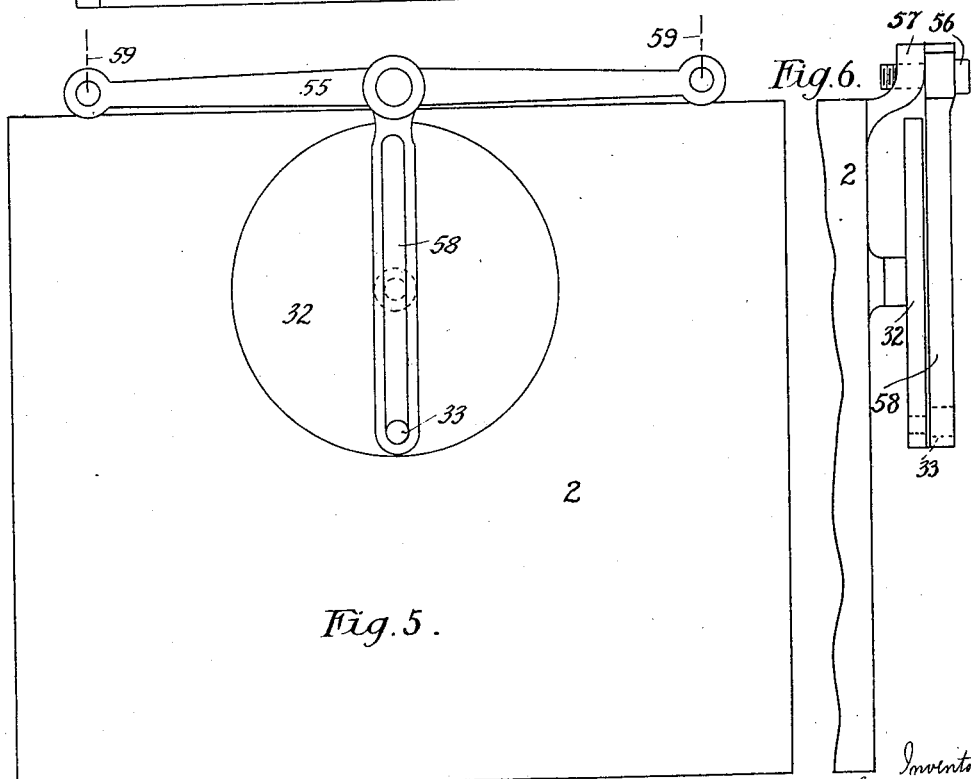

No. 654,186. Patented July 24, 1900.
A. STENHOUSE & E. A. WHITEHEAD.
TIME VALVE OPERATING MECHANISM.
(Application filed Sept. 2, 1899.)

(No Model.) 3 Sheets—Sheet 3.

Witnesses:
C. Holloway
H. C. Pinckney

Inventors:
Andrew Stenhouse,
Edwin Atkinson Whitehead.
By J. E. M. Bowen
Attorney.

UNITED STATES PATENT OFFICE.

ANDREW STENHOUSE AND EDWIN ATKINSON WHITEHEAD, OF BROKEN HILL, NEW SOUTH WALES.

TIME VALVE-OPERATING MECHANISM.

SPECIFICATION forming part of Letters Patent No. 654,186, dated July 24, 1900.

Application filed September 2, 1899. Serial No. 729,387. (No model.)

*To all whom it may concern:*

Be it known that we, ANDREW STENHOUSE, residing at Morgan street, and EDWIN ATKINSON WHITEHEAD, residing at Wolfram street, Broken Hill, in the Colony of New South Wales, subjects of the Queen of Great Britain, have invented certain new and useful apparatus for automatically operating a valve or the like at any predetermined time or times, of which the following is a specification.

This invention has for its object to provide apparatus for operating a valve or the like whereby the supply of gas, compressed air, steam, water, or other fluid flowing through a pipe or tube may be cut off, or arrested, or turned on, or started automatically at any predetermined time or times.

In a case with the valve-operating mechanism herein described is associated an ordinary clock; but as the clock mechanism may be of any well-known form the same has not been fully illustrated and described.

The invention embraces mechanism whereby the valve may be both opened and closed at such times as may be predetermined and whereby the operations of opening and closing the valve may be repeated automatically for as many days as the clock and alarm mechanism may be made to go with one winding up of their respective springs or drums.

Figure 2:
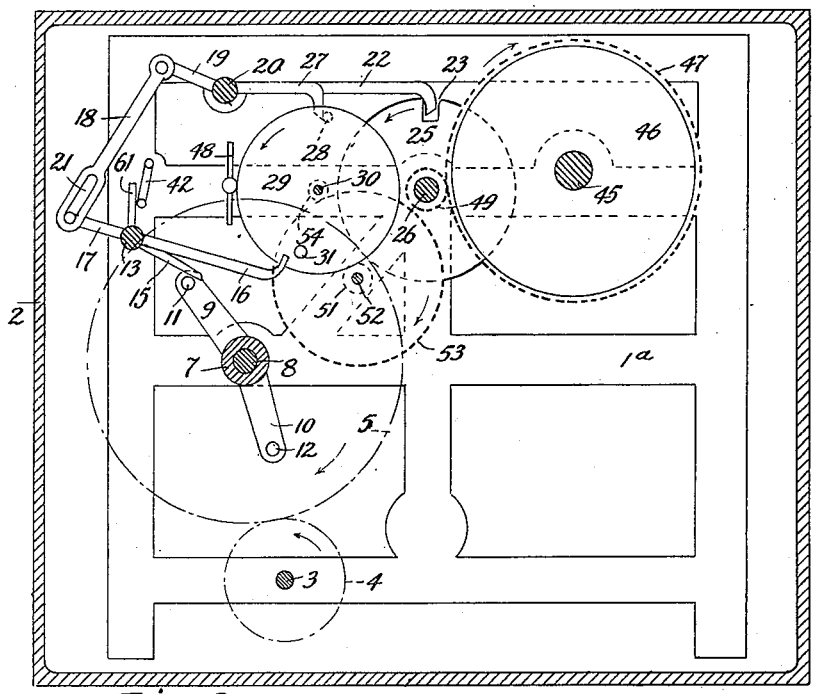
Figure 1:
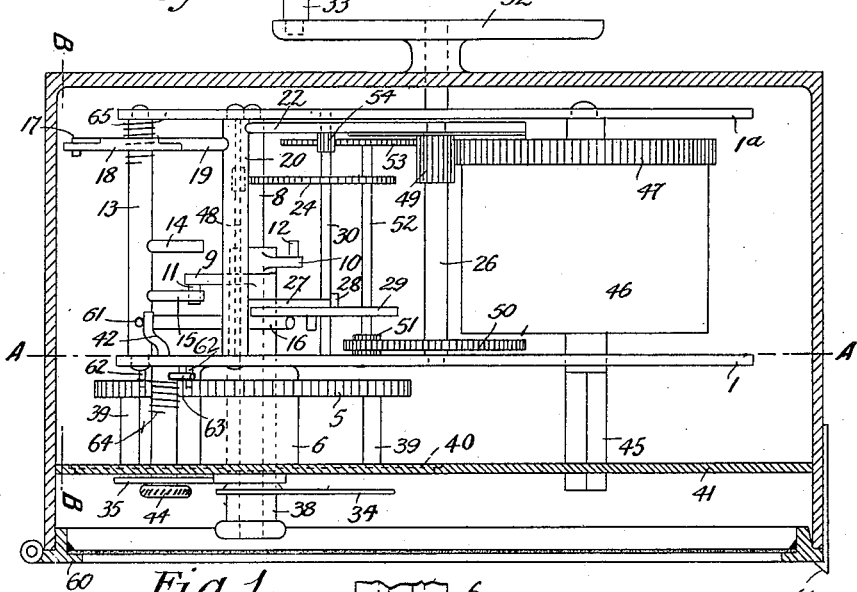
Figure 3:
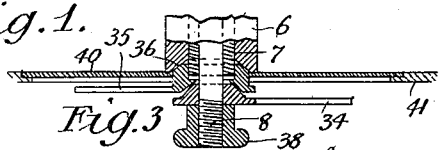
Figure 7:
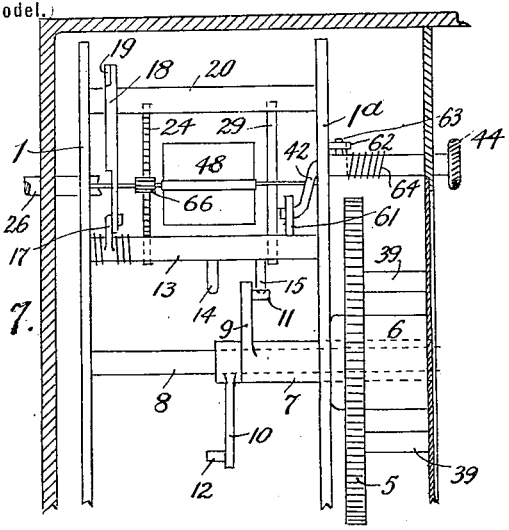
Figure 8:
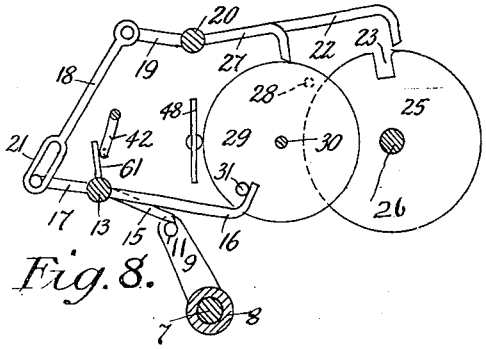
Figure 10:
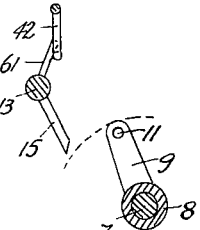
Figure 9:
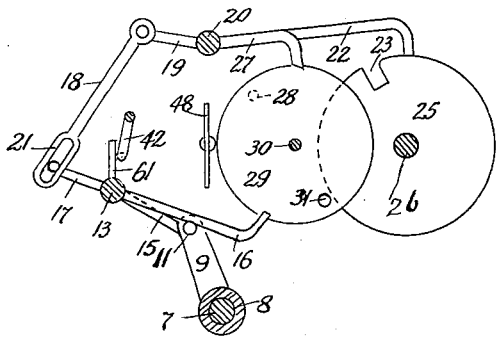

Referring now to the accompanying drawings, Figure 1 shows a sectional plan of the mechanism set in a case. Fig. 2 shows a sectional elevation of the mechanism taken on line A A of Fig. 1, but with the wheel 50 omitted and the position of the wheels 4 and 5 indicated. Fig. 3 represents a sectional plan showing the pointers and parts connected therewith. Fig. 4 is a front view of the case, showing the dial and pointers. Fig. 5 is a back view of the case, showing the operating-disk and T-lever. Fig. 6 is a side view of the parts shown in Fig. 5. Fig. 7 shows end view of a part of the mechanism taken on line B B of Fig. 1. Fig. 8 shows view of mechanism in the position it assumes after the "warning" and before the actual operation of the valve takes place; and Fig. 9 shows view of mechanism in position it assumes during the operation of valve, and Fig. 10 after the operation.

1 1[a] represent frame-plates which are set within a case 2.

3 represents a spindle having bearings in the frame-plates and which carries pinion 4. This pinion is driven by the clock-train (not shown) and gears with toothed wheel 5. The ratio of the pinion 4 to the wheel 5 is such that wheel 5 makes one revolution in twenty-four hours. The wheel 5 has a boss 6 and is set loose upon a hollow arbor 7, through which latter passes the arbor 8, having bearings in the frame-plates aforesaid. The hollow arbor 7 carries an arm 9, and to the arbor 8 is secured a similar arm 10. The arm 9 carries at its end a pin 11, which projects at right angles to it, and the arm 10 carries a similar pin 12. A spindle 13 has bearings in the frame-plates 1 1[a] and carries two projecting rods 14 15, which are arranged to engage, respectively, with the pins 12 and 11. The spindle 13 has attached also a hooked rod 16 and an arm 17. The latter is connected by a link 18 to an arm 19, which is projected from rocking shaft 20, having bearings in the frame. The link 18 has a slot 21, in which the arm 17 moves. To the rocking shaft 20 is attached an arm 22, the end of which is turned over in the form of a hook and is arranged to engage with a notch 23, (or notches,) cut in the periphery of disk 25. This disk is set upon the arbor 26, which has bearings in the frame-plates. Attached to the spindle 20 is an arm 27, having a hook arranged to engage with a pin or stud 28 on a disk or wheel 29, set upon the arbor 30; also, on the disk or wheel 29, but on the opposite side to the pin 28, is set pin 31, so arranged that it can engage with the hooked end of the rod 16 aforesaid.

Upon the shaft or arbor 26 outside the case is mounted a disk 32, having pin 33. In lieu of this disk a crank or barrel may be employed.

34 35 represent the indicators, (see Fig. 4,) one for the time of opening the valve and the other for the time of closing it. The indicator 35 passes over the end of the hollow arbor 7 and has conical portion 36, which bears against a corresponding cone formation at the end of the bush 6. The outer indicator or pointer 34 is set upon the arbor 8 and has a conical portion 37, which rests in a conical recess formed in the inner pointer 35. Upon the end of the arbor 8 is screwed the milled nut 38. By this construction the pointers and the wheel 5 may be securely bound or clamped together by screwing up the nut. To the main toothed wheel 5 is secured by pins 39 an indicator-dial 40. This dial is set in frame-plate 41, so as to rotate with the wheel 5. The dial is divided into twenty-four divisions representing hours, (see Fig. 4,) the pointers aforesaid being in front of the dial.

42 represents a cranked spindle which passes through the frame-plate 41 and has attached at its outer end a turn-button 44. The crank-spindle is arranged to engage with a pin 61, set on the spindle 13. A pin 63 is mounted on the crank-spindle, and pins 62 62 are set on the frame-plate 1. By means of these pins the travel of the crank-spindle is limited. A spring 64 is secured to pin 62 at one end and encircles crank-spindle to which its other end is secured. The spring holds the crank-spindle 42 against pin 61. A spring 65 is attached at one end to frame 1ª and encircles shaft 13, to which its other end is secured. This spring serves to return the shaft 13 and its rods from the position shown in Fig. 10 to that on Fig. 8.

45 represents the key-square on the arbor of the mainspring or drum 46 of the "alarm" mechanism and 47 the great wheel.

48 is the ordinary fly or fan commonly used and which regulates the velocity of the train of wheels. The train of wheels between the great wheel 47 and the fly 48 constitutes the actuating-train, and it will be readily understood that their number and proportions may be varied. The train of wheels which are shown consists of the following: pinion 49, actuated by the great wheel 47, wheel 50 on same arbor gearing with pinion 51 on the arbor 52, giving motion to the wheel 53, which in turn actuates the pinion 54 on the arbor 30, thus giving motion to the wheel 24, which by pinion 66 actuates the fly. The wheel 5 is actuated from the clock-train, as aforesaid, by the pinion 4.

We provide the following means of actuating a valve through the medium of the crank-disk 32. (See Figs. 5 and 6.) 55 is a T-shaped lever which is centered by pin 56 to bracket 57, supported by case 2 and having a slotted vertical arm 58, in the slot of which the pin 33 of the disk 32 is arranged to lie. Actuating devices, as cords or chains 59, are connected with the ends of the arms 55 and connect with the valve to be operated.

The box 2 has a hinged door 60 with glass or metal face, with any suitable clasp 66 at the side opposite the hinges.

The action of the mechanism is as follows: The indicators 34 35 are, after the nut 38 has been first loosened, brought opposite the hours on the dial 40 at which the operations of opening and closing of the valve are required to take place. Assume, for the sake of illustration, at seven p. m. and five a. m. (See Fig. 4.) The action of moving the indicators will cause the arbors 7 and 8, with their arms 9 and 10, to move in line with their respective pointers. The milled-head nut 38 is then tightened up, and the indicators are thus clamped together and to the boss of the wheel 5, so that said wheel, the indicators, with their arbors 7 and 8, and the arms 9 and 10, with their pins 11 and 12, all revolve together at the rate of one revolution in twenty-four hours. As the arm 9 (in line with the indicator 35) revolves its pin 11 engages with the arm 15 on the spindle 13, the parts being now in the position represented in Fig. 2. The arm 15 is gradually raised, and with it the arm 16. At the same time the bent arms 22 and 27 are, through the medium of the link 18 and the arms 17 and 19, raised. The arm 22 is thus brought clear of the notch in the wheel 25, and the arm 27 is at the same time raised clear of the pin 28 on the disk 29. The motor-train is now free and operates slightly—that is to say, revolves until the pin 31 catches against the hooked end of the rod 16, (which in the meantime has risen,) the parts being now in the position represented in Fig. 8. This action is known as the "warning" and takes place prior to the actual operation of the valve. This amount of revolution is provided in order that the length of contact between the pin 11 and the arm 15 may be appreciable and so that the notch in the wheel 25 shall travel from under the end of the rod 22 far enough to prevent it again falling into the notch when the train is released. When the pin 11 passes the end of the arm 15, which is arranged to take place at the time indicated by the pointer 35 on the dial, the rod 16 drops away from the pin 31 and releases the train. (See Fig. 9.) The arm 22 now rides upon the periphery of the wheel, and it keeps the arm 27 sufficiently raised to clear the pin 28. While the motor mechanism is thus in action rotation is given by the disk 32, from which the valve is actuated. When the notch 23 comes around again, the arm 22 falls into it. The pin 28 engages with the lever 27 to stop the motor-train. The slot shown in the end of the link 18 permits the lever 16 to fall sufficiently far to clear the pin 31 while the arm 22 is riding on the periphery of the disk 25. The action of the arm 9 and parts controlled by it having been described, it will be readily understood that a similar action occurs when the arm 10 engages the rod 14, the disk 32 in this case being further rotated to turn the valve off or on, as the case may be. If less than one revolution of the disk 24 be required for each operation of opening or closing the valve, an additional notch or notches are cut in its periphery in such positions as may be required. By turning the button 44 the cranked spindle 42 will release its pressure from the pin 61 and allow the shaft 13 to turn so as to move the levers 14 and 15 out of the way of the pins 11 and 12 (see Fig. 10) during the setting of the indicators 34 and 35, and so prevent the starting of the motor-train and the consequent operating of the valve during the setting of the apparatus. On releasing the turn-button 44 the levers 14 and 15 are caused to return to their normal position by means of the spring 65.

It will now be readily understood that the operation of opening and closing a valve may be repeated automatically for as many days as the respective mainsprings will keep the motor and clock trains going at each winding up.

It has been shown how to obtain an intermittent rotary motion of the crank-disk 32, the times and extents of such motions being previously determined. It only remains, therefore, to describe how the same may be applied to the operating of a valve. This is performed through the medium of the T-lever, which the disk actuates, and which in turn actuates the valve by the cords 59. We may, however, dispense with the T-lever and actuate the valve directly from the crank-disk.

Having now particularly described and ascertained the nature of our said invention and in what manner the same is to be performed, we declare that what we claim is—

1. In apparatus for operating a valve, in combination, motor mechanism, arbor 8 having suitable bearings, a hollow arbor 7 having arm 9 for actuating the motor mechanism, a toothed wheel 5 mounted on the hollow arbor and actuated from clock-gear, a rotatable dial 40 attached to said wheel, a pointer 35 on the hollow arbor 7, a pointer 34 on arbor 8, a nut 38 for releasing and screwing up the said parts so that they will all rotate together, a motor-train having a shaft 26, crank 32, and T-lever 55 operated by said crank.

2. In apparatus for operating a valve in combination an arbor 8 having suitable bearings, a hollow arbor 7 having arm 9 for actuating motor mechanism, a toothed wheel 5 mounted on the hollow arbor and actuated from clock-gear, a rotatable dial 40 attached to said wheel, a pointer 35 on the hollow arbor 7 and a pointer 34 on the arbor 8, a nut 38 for releasing and screwing up the said parts so that they will all rotate together, an arm 10 on the arbor 8, the said arms 9 and 10 being approximately in line always with their pointers and arranged during their rotation to actuate mechanism to set the motor going at the predetermined times as indicated by their pointers and the disk or crank 32 and actuating devices operated by said disk or crank substantially as set forth.

3. In apparatus for operating a valve in combination an arbor 8, having bearings in frame, a hollow arbor 7 having arm 9 for actuating motor mechanism, a toothed wheel 5 mounted on the hollow arbor and actuated from clock-gear, a rotatable dial 40 attached to said wheel, a pointer 35 on the hollow arbor 7 and a pointer 34 on the arbor 8, a nut 38 for releasing and screwing up the said parts so that they will all rotate together, an arm 10 on the arbor 8, the said arms 9 and 10 being approximately in line always with their pointers and arranged during their rotation to actuate mechanism to set the motor going at the predetermined times, a spindle 13 having rods 14, 15 to engage with arms 9, 10 and a hooked rod 16, a disk 29 having a pin 31 to engage with said hooked rod, the spindle 13 being connected by rods and a slotted link to rocking shaft 20 which latter carries arm 27 having a hook to engage with pin 28 on the disk 29 and an arm 22 to engage with disk 25 mounted on arbor 26 from which a valve is actuated substantially as set forth.

4. In apparatus for actuating a valve in combination a motor mechanism, rotatable crank-spindle 42 having pin 63, limiting-stops 62 for pin set on frame of apparatus and a spring 64 to return the crank-spindle after operation, a pin 61 mounted on spindle 13 and arranged to engage with the said crank-spindle whereby said spindle 13 and parts connected with it may be moved independently of the motor mechanism, a spring 65 for maintaining a pressure of pin 61 against crank-spindle, substantially as set forth.

5. In apparatus for actuating a valve in combination a disk as 25 mounted on a spindle 26, means of actuating disk and spindle at predetermined times, a disk 32 on spindle 26 having pin 33, a slotted T-lever 55 rocked by said disk, and actuating devices operated by the T-lever; substantially as set forth.

6. In an apparatus for operating a valve the combination of a driven spindle 3, pinion 4 thereon, a large toothed wheel 5 which is revolved by wheel 4 once in twenty-four hours, hollow arbor 7 on which wheel 5 is loosely mounted, arbor 8 passing through arbor 7, arm 9 carried by arbor 7, arm 10 carried by arbor 8, pins 11, 12 projecting at right angles from arms 9, 10, spindle 13, rods 14, 15 projecting from spindle 13 in the path of pins 11, 12, respectively, hooked rod 16 and arm 17 projecting from spindle 13, shaft 20, link 18 and arm 19, between shaft 20 and arm 17, a notched disk 25, shaft 26 therefor, arm 22 extending from shaft 20 and adapted to engage and be disengaged from the notch, arm 27 also projecting from shaft 20, a disk 29, a pin on disk 29 in position to be engaged by arm 27, pin 31 on the opposite side of disk 29 from pin 28 and in the path of rod 16 when the latter is raised, a crank on shaft 26, and means for conveying motion from the crank to the apparatus to be operated, first in one direction and then in the opposite direction.

7. In an apparatus for operating a valve the combination of a driven spindle 3, pinion 4 thereon, a large toothed wheel 5 which is revolved by wheel 4 once in twenty-four hours, hollow arbor 7 on which wheel 5 is loosely mounted, arbor 8 passing through arbor 7, arm 9 carried by arbor 7, arm 10 carried by arbor 8, pins 11, 12 projecting at right angles from arms 9, 10, spindle 13, rods 14, 15 projecting from spindle 13 in the path of pins 11, 12, respectively, hooked rod 16 and arm 17 projecting from spindle 13, shaft 20, link 18 and arm 19, between shaft 20 and arm 17, a notched disk 25, shaft 26 therefor, arm 22 extending from shaft 20 and adapted to engage and be disengaged from the notch, arm 27 also projecting from shaft 20, a disk 29, a pin on disk 29 in position to be engaged by arm 27, pin 31 on the opposite side of disk 29 from pin 28 and in the path of rod 16 when the latter is raised, a crank on shaft 26, and means consisting of the lever 55 pivoted at 56 having an arm 32 with a slot 58 engaged by pin 33, and cords 59 for conveying motion from the crank to the apparatus to be operated, first in one direction and then in the opposite direction.

8. In an apparatus for operating a valve the combination of a driven spindle 3, pinion 4 thereon, a large toothed wheel 5 which is revolved by wheel 4 once in twenty-four hours, hollow arbor 7 on which wheel 5 is loosely mounted, arbor 8 passing through arbor 7, arm 9 carried by arbor 7, arm 10 carried by arbor 8, pins 11, 12 projecting at right angles from arms 9, 10, spindle 13, rods 14, 15 projecting from spindle 13 in the path of pins 11, 12, respectively, hooked rod 16 and arms 17 projecting from spindle 13, shaft 20, link 18 and arm 19, between shaft 20 and arm 17, a notched disk 25, shaft 26 therefor, arm 22 extending from shaft 20 and adapted to engage and be disengaged from the notch, arm 27 also projecting from shaft 20, a disk 29, a pin on disk 29 in position to be engaged by arm 27, pin 31 on the opposite side of disk 29 from pin 28 and in the path of rod 16 when the latter is raised, a crank on shaft 26, and means for conveying motion from the crank to the apparatus to be operated, first in one direction and then in the opposite direction, pointer 35 adjustably secured to the hollow shaft, pointer 34 adjustably secured to shaft 8, indicator-dial 40 secured to wheel 5 so as to be rotated thereby, a spindle and crank 42, pin 61 on spindle 13 adapted to be engaged by said crank, pin 63 on the crank-spindle, limiting-pins 62 for the crank-spindle, a spring tending to hold the crank against said pin 61, and a returning-spring for spindle 13.

9. The combination of dial 40, adjustable pointers 34, 35, arbor 7, wheel 5 loose thereon, means for driving wheel 5, means for connecting said dial and wheel to rotate together, arbor 8, arms 9, 10, on arbors 7, 8, pins 11, 12 projecting from arms 9, 10, said arms moving with the pointers one revolution in twenty-four hours, the alarm-train, spindle 13, arms 15, 16, 17, 61 thereon, and means operated by said arms to release and then to stop the train after a short movement, as set forth.

10. The combination of dial 40, adjustable pointers 34, 35, arbor 7, wheel 5 loose thereon, means for driving wheel 5, means for connecting said dial and wheel to rotate together, arbor 8, arms 9, 10, on arbors 7, 8, pins 11, 12 projecting from arms 9, 10, said arms moving with the pointers one revolution in twenty-four hours, the alarm-train, spindle 13, arms 15, 16, 17, 61 thereon, link 18 having a slot 21, a pin on arm 17 engaging the slot, arm 19, spindle 20, arms 22, 27 adapted to engage and to be disengaged from wheels of the train, as set forth.

Signed at Melbourne, in the Colony of Victoria, Australia, this 18th day of July, 1899.

ANDREW STENHOUSE.
EDWIN ATKINSON WHITEHEAD.

Witnesses:
  A. O. SACHSE,
  A. HARKER.